(12) United States Patent
Memisoglu et al.

(10) Patent No.: US 12,494,955 B2
(45) Date of Patent: Dec. 9, 2025

(54) METHOD OF BLIND DETECTING A TYPE AND BAND OF NUMEROLOGY IN CELLULAR COMMUNICATION SYSTEMS AND A SIGNAL RECEIVING UNIT OPERATING ACCORDING TO SAID METHOD

(71) Applicant: ISTANBUL MEDIPOL UNIVERSITESI, Istanbul (TR)

(72) Inventors: Ebubekir Memisoglu, Istanbul (TR); Ahmad Mohammad Abd-alghani Jaradat, Istanbul (TR); Hüseyin Arslan, Istanbul (TR)

(*) Notice: Subject to any disclaimer, the term of this patent is extended or adjusted under 35 U.S.C. 154(b) by 253 days.

(21) Appl. No.: 18/259,730

(22) PCT Filed: Dec. 24, 2021

(86) PCT No.: PCT/TR2021/051506
§ 371 (c)(1),
(2) Date: Jun. 28, 2023

(87) PCT Pub. No.: WO2022/146364
PCT Pub. Date: Jul. 7, 2022

(65) Prior Publication Data
US 2024/0073073 A1    Feb. 29, 2024

(30) Foreign Application Priority Data
Dec. 31, 2020  (TR) ................................ 2020/22624

(51) Int. Cl.
*H04L 27/26* (2006.01)

(52) U.S. Cl.
CPC .... *H04L 27/26025* (2021.01); *H04L 27/2605* (2013.01)

(58) Field of Classification Search
CPC ...................... H04L 27/26025; H04L 27/2605
See application file for complete search history.

(56) References Cited

U.S. PATENT DOCUMENTS

| | | |
|---|---|---|
| 9,160,589 B1 | 10/2015 | Ramlall |
| 10,230,492 B2 | 3/2019 | Kwon et al. |
| 2018/0191462 A1 | 7/2018 | Kwon et al. |
| 2019/0230706 A1 | 7/2019 | Li et al. |
| 2020/0280362 A1* | 9/2020 | Garcia ................. H04B 7/0617 |
| 2022/0094473 A1* | 3/2022 | Nimbalker ............ H04L 1/1664 |

OTHER PUBLICATIONS

International Search Report for corresponding PCT/TR2021/051506 dated Apr. 7, 2022.
Written Opinion of the International Searching Authority for corresponding PCT/TR2021/051506 dated Apr. 7, 2022.

* cited by examiner

*Primary Examiner* — Samina F Choudhry
(74) *Attorney, Agent, or Firm* — Egbert, McDaniel & Swartz, PLLC

(57) ABSTRACT

Disclosed is a method for detecting the numerology types and bands in the received signal without using any control information in the systems using mixed numerology (e.g. 5G standard) and to a signal receiving unit operating according to the method.

11 Claims, 3 Drawing Sheets

METHOD OF BLIND DETECTING A TYPE AND BAND OF NUMEROLOGY IN CELLULAR COMMUNICATION SYSTEMS AND A SIGNAL RECEIVING UNIT OPERATING ACCORDING TO SAID METHOD

TECHNICAL FIELD

The invention relates to a method for detecting the types of numerology available from the received signal and the bands of said numerologies in the frequency space without using any control information in the systems using mixed numerology structures (e.g. 5G standard) and a signal receiving unit operating by said method.

PRIOR ART

Today, it is determined by the 3rd Generation Partnership Project (3GPP) to use the mixed numerology structure in the 5G standard developed for wireless communication, unlike the previous standards. OFDM signals with different sub-carrier ranges can be used instead of the Orthogonal Frequency-Division Multiplexing (OFDM) waveform with a single sub-carrier range in this way. This indicates that each numerology should have a different sub-carrier range. The mixed numerology structure in the 5G standard has been developed to be used to deliver a quality service to new users and devices that will have very different requirements. In other words, use of a waveform with a wider sub-carrier range has been provided to reduce phase noise effects in the use of millimeter wave spectrum. Thus, applications with very different requirements can be used by a wider user group with very low delays by using the mixed numerology structure in the 5G standard.

Cyclic prefix (CP) correlation is used to detect blind the control information required for mixed numerology structures. The received signal is correlated for different CPs and the situation where the correlation value is the largest indicates the accuracy of the assumption. For example, it is decided that that numerology is present in the signal in cases where any numerology is within the signal and it is understood that there is a similarity in CP correlation. However, it is not possible to determine which band the detected numerology uses in the frequency space with this method.

It is necessary to know the types of numerologies used and the location of the bands in the spectrum in order to correctly analyze the signal in the receiver. The large amount of control information that needs to be sent with the complexity of the systems reduces the spectral efficiency. The acceptance of mixed numerology structures leads to an increase in this situation. For this reason, this information is sent in addition to the data sent in the 5G standard. Blind detection methods can be used to reduce the control information to be sent. For example, a system and method for the blind detection of a numerology of a signal received are disclosed in the patent document U.S. Pat. No. 10,230,492, which is in the state of the art. Blind detection of the numerology types in the received signal in said document is performed by using the prefix (CP) correlation, but the position of this numerology in the spectrum is not determined.

The bit error rate (BHO) performances of the transmission techniques that are candidates for the fifth generation (5G) communication systems are mentioned in the study, which is located at the link https://dergipark.org.tr/tr/download/article-file/870898, which is another known state of the art.

The document contains the block diagram of the F-OFDM technique. This technique is also available in the literature. In addition, only the bands are separated in this article. In addition, there is no technique for detecting numerology in this article.

BRIEF DESCRIPTION OF THE INVENTION

The object of the invention is to develop a method for detecting the types of numerology available from the received signal and the bands of said numerologies in the frequency space without using any control information in the systems using mixed numerology structures (e.g. 5G standard) and a signal receiving unit operating by said method. Thus, the amount of control information required to be sent for mixed numerology structures is reduced with this method. The numerology types in the received signal and the band locations of said numerologies are detected blind using the CP correlation in the invention. The numerology type and numerology sub-band are determined since a preliminary process is performed and CP correlation is made after the bands are separated in the invention.

F-OFDM is not used in the invention, unlike the known state of the art. The bands are separately transformed into time space and CP correlation is performed in the invention.

The amount of information required to be sent for mixed numerology will be reduced in this way. The invention also improves blind detection performance for the numerology type and band.

DESCRIPTION OF THE REFERENCES IN THE FIGURES

The corresponding numbers in the figures are given below in order to better understand the invention:
- 10. Signal receiving unit
  - 10.1 Control unit
  - 10.2 Storage unit
- 100. Method

DETAILED DESCRIPTION OF THE INVENTION

The signal receiving unit (10) of the invention includes at least one control unit (10.2) that detects the numerology types and the positions of the numerology bands in the received signal without using any control information in the systems using mixed numerology structures (e.g. 5G standard) and at least one storage unit (10.3) where the detected data is stored. The types of numerology used in the invention are, for example, numerologies with a sub-carrier range of 15, 30, 60, 120 kHz in the 5G standard. There may also be numerologies with different sub-carrier ranges. The type of numerology refers to the detection of the sub-carrier range used here.

It is assumed that the system communicates in a certain band, and this total band is thought to be divided into M sub-bands here. Only the positions of the sub-bands are determined in the invention.

The numerology types used in the signal and their band positions are sent using control information in classical communication. The positions of the numerology bands are determined without using any control information in the invention.

Said signal receiver (10) is an antenna in the preferred embodiment of the invention and is not limited to this in practice.

Figure 1:
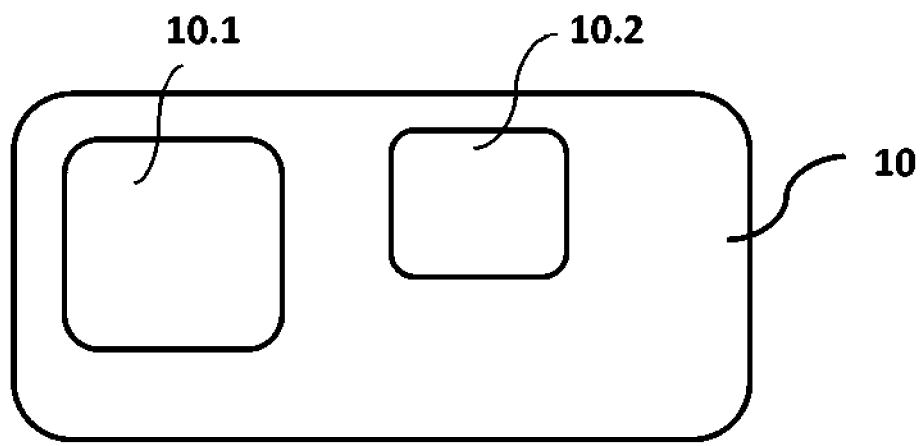
FIG. 1. A view of the schematic block diagram of the receiving unit of the invention.
Figure 2:
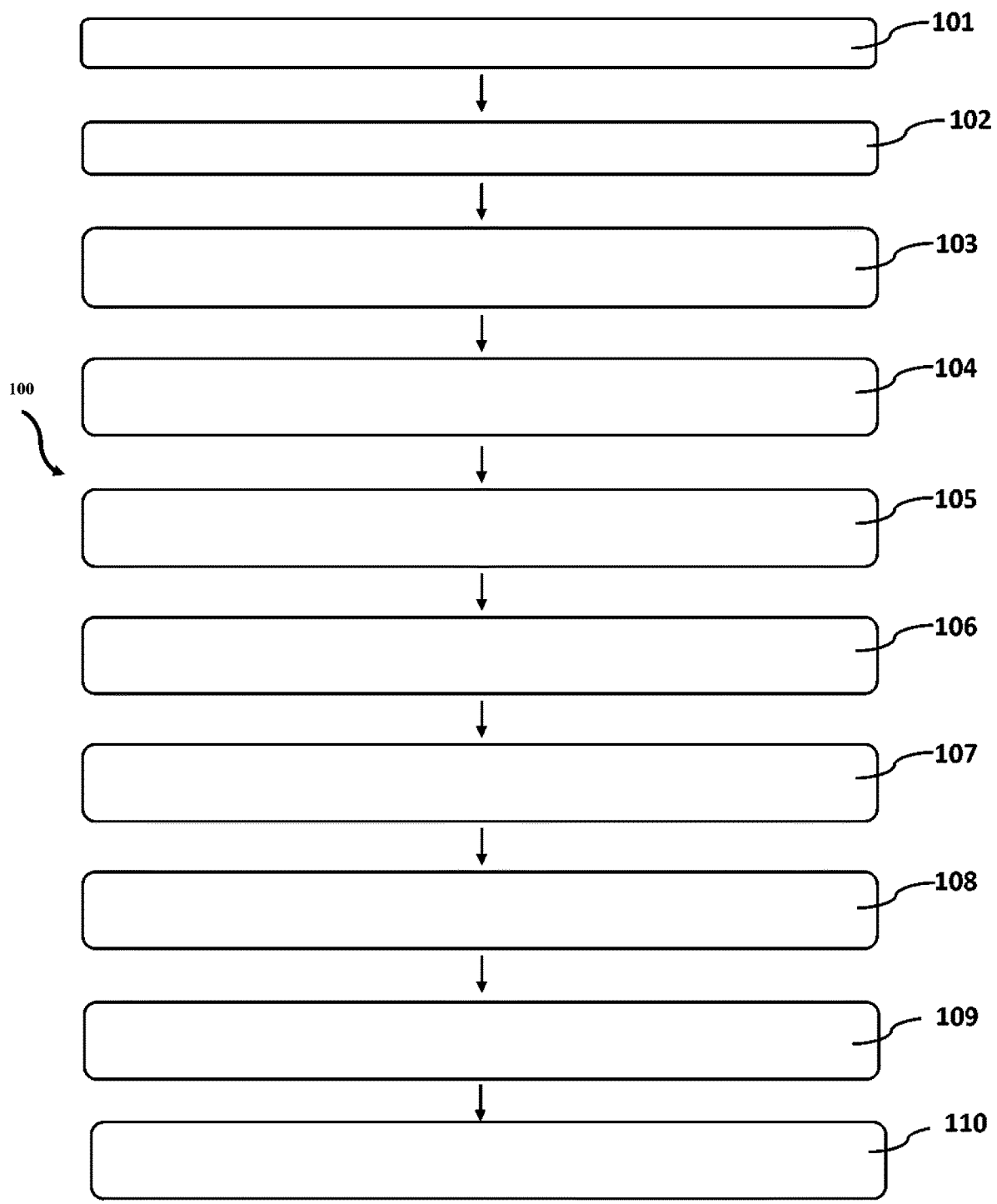
FIG. 2. The general view of the flow diagram of the method of the invention.
Figure 3:
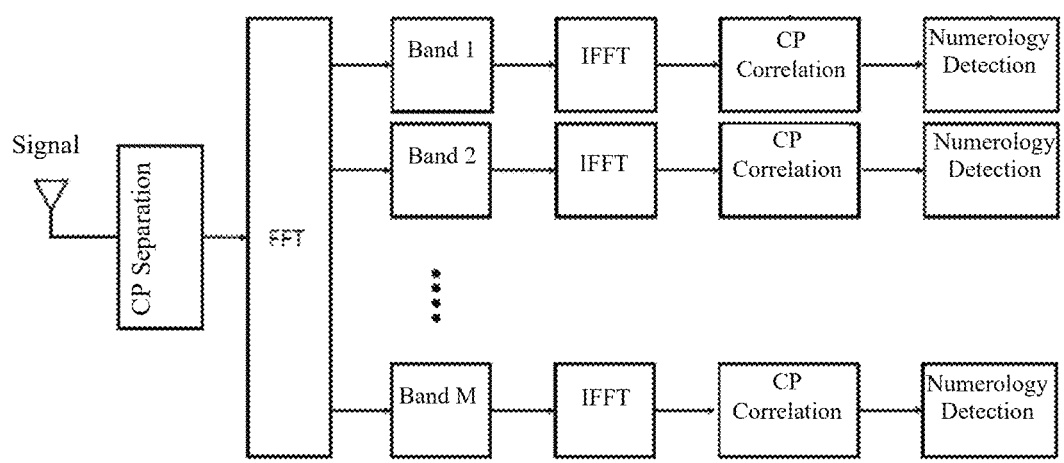
FIG. 3. The generalized block diagram of the method of the invention.

In order to determine the types of numerology available from the received signal and the location of the bands, the control unit (10.2), performs the CP separation process of the OFDM symbol in the time space according to the numerology with the smallest sub-carrier range in the received signal before transferring the received signal to the digital environment by analog process and then going to the frequency space, applies the serial/parallel transformation, then transforms the signal received by the N-dimensional fast Fourier transformation (FFT) process into the frequency space; performs the filtering process for the detection of the numerology of each band forming the total band consisting of M sub-bands in the frequency space for sub-carriers with different numerologies, then by applying N-dimensional inverse fast Fourier transform (IFFT) process for each band, transforms each filtered band into time space, then applies the parallel/serial transformation and performs the cyclic prefix correlation process with the CP configurations in each band and finally determines the numerology type in each band by finding the CP configuration where the correlation is made. The generalized block diagram of the method (100) used for the signal receiving unit (10) is shown in FIG. 3.

The signal receiver unit (10) subject to the invention generally works according to the following methods (100) in order to detect the numerology types and bands in the signal received by the signal receiver (10) without using any control information:

Receiving the signal by the signal receiver (10) and performing analog processes (101)

Transmitting the received signal to the digital environment, i.e. to the data storage unit (10.3) (102)

Removing the CP part of the OFDM symbol in the time space by the control unit (10.2) (cyclic prefix separation) (103)

Executing by the control unit (10.2) the series/parallel transformation (104)

Ensuring the transformation of the signal in the time space by the control unit (10.2) to the frequency space (FFT-Fast Fourier transformation) (105)

Ensuring that each of the M bands in the frequency is individually filtered by the control unit (10.2) (106)

Ensuring the transformation of each band filtered in the frequency by the control unit (10.2) into the time space (IFFT-Inverse fast Fourier transformation) (107)

Executing by the control unit (10.2) the parallel/series transformation (108)

Correlating the time signal obtained by the control unit (10.2) for each band with different CP configurations (cyclic prefix correlation) (109)

Determining the numerology type in each band by finding the CP configuration where the correlation is made (110).

IFFT, CP correlation and numerology detection process are performed in the method of the invention (100), unlike the known state of the art (Step 107, Step 109, and Step 110).

It is assumed that the locations of the sub-bands are known in the method of the invention (100). The invention determines in which sub-bands the types of numerology are used.

The signal mentioned in Step 101 is obtained by collecting OFDM symbols of different numerologies passing through the channel in the method (100). The symbol length of OFDM is also different due to different numerology. The addition of CP is placed in front of the last part of the OFDM symbol, and the CP alignment of different numerologies is different. For example, numerologies with a sub-carrier frequency range such as 15, 30, 60 KHz can be used at the same time in 5G systems. The symbol length is equal to the inverse of the sub-carrier frequency range and the CP lengths are directly proportional to the symbol length. However, CP length can also be at different rates.

The signal must be transferred to the digital environment for the process of transferring the data to the storage unit mentioned in step 102. In other words, the sampled signal is obtained in this way. A storage unit is required for this.

CP separation is performed according to the numerology with the smallest sub-carrier range in the received signal before going to the frequency space in step 103. Afterward, the signal in question is transformed into the frequency space by the N-dimensional fast Fourier transformation (FFT) process in step 105. The total band having M sub-carriers consists of sub-bands belonging to different numerologies here. At least one protection band is placed between them, unlike the known state of the art, as stated in the previous art since different numerology bands do not have a perpendicular feature with each other. Interference that may occur due to this protection band is prevented. In addition, the protection bands can also be used to define the sub-bands. Therefore, it is ensured that the numerology type and the location of the band are known without using any control information for the mixed numerology structure. The amount of control information required to be sent decreases since the method (100) used for the signal receiving unit (10) of the invention detects the existing numerology types and the bands of these numerologies in the frequency space without using additional control information.

It is assumed that the total number of bands mentioned in step 106 consists of M sub-bands, and these bands consist of sub-carriers with different numerology. The filtration process mentioned in step 106 is performed in order to determine the numerology of each band in the frequency space. Filtering is done separately for each band by zeroing the sub-carriers outside the selected band. N-dimensional inverse fast Fourier transformation (IFFT) process is applied for each band in step 107. Thus, it is ensured that the numerology determination in each band is made separately. For example, when it is desired to determine the numerology for Band 1 in a band with N sub-carrier, a time signal is found for Band 1 by performing N-dimensional IFFT process by zeroing the sub-carriers other than Band 1. If the signal in Band 1 obtained in time space does not belong to the narrowest numerology, it contains CP signals. The signal portion extracted in Step 103 may be added to the beginning of the time signal obtained for each band other than Band 1. A similarity is found in the narrowest numerology for Band 1 by performing the CP correlation in step 109 in this way. Numerology is determined separately for each band by repeating this process. There may be a state of non-use of any band in the system (empty band state), in this case, in order to detect the empty band and the narrowest numerology, the signal separated in step 103 must be added to the signals obtained after step 107. Therefore, the CP signal separated in step 103 before the CP correlation process is added separately to the beginning of the signals obtained after step 107. There is no problem in cases where empty band is used in this way.

Mixed numerology OFDM symbols are sent overlapping in time space, while frequency space uses separated bands. The interference between different numerology bands is prevented by placing a protective band since different numerologies do not have perpendicular properties in the frequency space. The bands used can be detected thanks to the protection bands used in one embodiment of the invention. Therefore, it is necessary to know the numerology type and the location of the band in order not to use any control information for the mixed numerology structure. Knowing this is necessary for the invention. The invention attempts to determine the numerology type and band. It can be known by knowing the location of the sub-bands in the frequency space or by using their protection bands for this. For example, assuming that the location of the M sub-band is known in the frequency space, and it is still unknown which numerology is known in which sub-band in this case. The invention determines the numerology in these bands. The invention also works in cases where protection band is not used. It is therefore only to assume that the location of the sub-bands is known and to explain that the protection bands can be used in cases where they are not known.

The CP correlation process mentioned in step 109 is applied to different CP configurations from the signal (step 107) in the obtained time space in order to determine the numerology in each band. It is assumed that said set is known in the preferred embodiment of the invention since it is necessary to know the set of different CP configurations in order to perform said process. The CP part is obtained by copying the last part of the OFDM symbol, and gives a high correlation value when the correct CP configuration is selected. The CP correlation process is performed by multiplying the signal in the CP configuration by sliding over the obtained signal. If the value obtained exceeds a predetermined correlation threshold value, it means that there is a similarity state. In other words, exceeding the threshold value means that the numerology in the selected band has been determined (step 110). For example, assuming that CP correlation is made for the time signal of Band 1 according to the 30 kHz numerology, if the obtained correlation value is greater than the threshold value, it is determined that 30 kHz numerology is used in Band 1. All numerologies in the M band can be determined separately in this way. It is understood that there is a similarity between these two signals if there is a peak formation in the figure to be obtained as a result of CP correlation. In other words, the threshold value can vary for different situations. It is important to determine this value for the performance of the detection accuracy. It is assumed that the threshold value mentioned in the example is determined considering the simulation results.

The numerology type in the signal is determined in the process in step 110. However, the numerology in each band is determined separately, since the bands are separated in the frequency space and CP correlation is made. For example, there are M sub-bands in the invention and if numerology is determined for each sub-band (step 110) the numerology types and bands used in the received signal are determined.

Industrial Applicability of the Invention

The invention relates to a method (100) for use in systems using mixed numerology structures (e.g. 5G standard) and the signal receiving unit (10) operating by said method and is applicable to the industry.

The invention is not limited to the above explanations; however, a person skilled in the art can easily present different embodiments of the invention. They must be assessed within the scope of the protection claimed by the claims of the invention.

The invention claimed is:

1. A method for detecting numerology types and bands in a received signal without using any control information in the systems using mixed numerology (e.g. 5G standard), by the method comprising the following steps:
   receiving a signal by a signal receiver and performing analog processes (101);
   transmitting the received signal to a data storage unit (102);
   removing a CP part of the OFDM symbol in the time space by a control unit (cyclic prefix separation) (103);
   executing by the control unit a series/parallel transformation (104);
   ensuring the transformation of the signal in the time space by the control unit to a frequency space (FFT-Fast Fourier transformation) (105);
   ensuring that each M band in the frequency is individually filtered by the control unit (106);
   ensuring the transformation of each band filtered in the frequency by the control unit into a time space (IFFT-Inverse fast Fourier transformation) (107);
   executing by the control unit the parallel/series transformation (108);
   correlating the time signal obtained by the control unit for each band with different CP configurations (cyclic prefix correlation) (109); and
   determining the numerology type in each band by finding the CP configuration where the correlation is made (110).

2. A method according to claim 1, wherein the signal mentioned in step 101 is obtained by collecting OFDM symbols of different numerologies passing through the channel.

3. A method according to claim 2, comprising performing CP separation according to the numerology with the smallest sub-carrier range in the received signal before going to the frequency space in step 103.

4. A method according to claim 3, wherein the total number of bands mentioned in step 106 is assumed to comprise M sub-bands and these bands comprise sub-carriers with different numerology.

5. A method according to claim 4, wherein the filtering process mentioned in step 106 is carried out separately for each band and by zeroing the sub-carriers outside the selected band.

6. A method according to claim 5, wherein N-dimensional inverse fast Fourier transformation (IFFT) process is applied for each band in step 107.

7. A method according to claim 6, wherein the CP correlation process mentioned in step 109 is applied to different CP configurations from the signal (step 107) in the obtained time space.

8. A method according to claim 7, wherein the numerology detection in step 110 is performed if the CP correlation value obtained multiplying the CP configuration signal by sliding over the obtained signal is greater than a predetermined correlation threshold value.

9. A signal receiving unit wherein it operates according to claim 1.

10. A signal receiving unit for detecting available numerology types and location of bands from a received signal, comprising the following:
    at least one control unit performing CP separation process of the OFDM symbol in a time space according to a numerology with the smallest sub-carrier range in the received signal before transferring the received signal to a digital environment by analog process and then going to a frequency space, then applying a series/parallel transformation, transforming the signal received by N-dimensional fast Fourier transformation (FFT) process into a frequency space; performing a filtering process for the detection of the numerology of each band forming the total band comprising M sub-bands in the frequency space for sub-carriers with different numerologies, then, by applying N-dimensional inverse fast Fourier transformation (IFFT) process for each band, transforming each filtered band into time space, then applying parallel/serial transformation and performing a cyclic prefix correlation process with the CP configurations in each band and finally determining the numerology type in each band by finding the CP configuration where the correlation is made, and at least one data storage unit storing the detected data.

11. A signal receiving unit according to claim 10, wherein it is an antenna.

* * * * *